US007201269B2

(12) United States Patent
Büscher et al.

(10) Patent No.: US 7,201,269 B2

(45) Date of Patent: Apr. 10, 2007

(54) DEVICE FOR HEATING ESCALATORS OR MOVING WALKWAYS

(75) Inventors: Hans-Werner Büscher, Unna (DE); Hans Kleine-Brüggeney, Hattingen (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/237,917

(22) Filed: Sep. 29, 2005

(65) Prior Publication Data

US 2006/0021850 A1 Feb. 2, 2006

Related U.S. Application Data

(63) Continuation of application No. 10/911,735, filed on Aug. 5, 2004, now Pat. No. 6,994,204, which is a continuation of application No. PCT/EP03/00168, filed on Jan. 10, 2003.

(30) Foreign Application Priority Data

Feb. 5, 2002 (DE) ................................ 102 04 779

(51) Int. Cl.
*B65G 15/00* (2006.01)

(52) U.S. Cl. ........................ 198/335; 198/337; 198/494

(58) Field of Classification Search ................ 198/321, 198/323, 326, 331, 335, 337, 494, 952
See application file for complete search history.

(56) References Cited

U.S. PATENT DOCUMENTS

| | | | | |
|---|---|---|---|---|
| 2,839,651 | A * | 6/1958 | Erickson | 219/649 |
| 4,927,003 | A * | 5/1990 | Swinderman et al. | 198/497 |
| 5,299,447 | A * | 4/1994 | Caron | 73/1.26 |
| 5,798,038 | A * | 8/1998 | Huber | 210/154 |
| 6,382,389 | B1 * | 5/2002 | Mehlert et al. | 198/335 |
| 6,595,049 | B1 * | 7/2003 | Maginnis et al. | 73/202.5 |

FOREIGN PATENT DOCUMENTS

| | | |
|---|---|---|
| JP | 10182044 A * | 7/1998 |

* cited by examiner

*Primary Examiner*—Gene O. Crawford
*Assistant Examiner*—Rashmi Sharma
(74) *Attorney, Agent, or Firm*—Venable LLP; Robert Kinberg; Ryan M. Flandro

(57) ABSTRACT

An escalator or moving walkway is provided in combination with a device for heating components of the escalator or moving walkway. The device includes at least one pivotably mounted heating element adapted to direct heated air onto a selected component of the escalator or moving walkway.

15 Claims, 2 Drawing Sheets

DEVICE FOR HEATING ESCALATORS OR MOVING WALKWAYS

CROSS-REFERENCE TO RELATED APPLICATION

This application is a continuation of U.S. patent application No. 10/911,735 filed Aug. 5, 2004, now U.S. Pat. No. 6,994,204, issued Feb. 7, 2006, which is a continuation of International Patent Application No. PCT/EP03/00168 filed Jan. 10, 2003, designating the United States and claiming priority of German Patent Application No. 102 04 779.0 filed Feb. 5, 2002, the disclosures of the foregoing applications being incorporated herein by reference.

BACKGROUND OF THE INVENTION

The invention relates to a device for heating especially the mobile components of an escalator or a moving.

For heating escalators and moving walkways, it is generally known to provide central fan heating in the form of a fan register, which is in particular placed between the step or pallet band, and from which hot air, which is generated there, is guided through hoses to the corresponding sites of the escalator or the moving walkway. Herein, it is a drawback that the installed plurality of hoses, which are guided towards the endangered sites (handrail, step or pallet band, comb plate or the like), entail high heat losses, which reduce the efficiency of the central fan heating to a minimum. Furthermore, this system is expensive both with respect to acquisition and installation and with respect to maintenance. In particular at lower temperatures it can happen that the escalator or the moving walkway can no more be operated in a correct way in spite of an integrated heating. Furthermore, due to the dimensioning of the central fan heating, there is no possibility to use the same one in the relatively narrow balustrade area, in particular with balustrades of small construction.

GB-A 1,109,976 discloses an escalator having heating, which heating is placed in the region of the accessible parts of the escalator. A heating device is provided in the maintenance space of the escalator, which heating leads several hot air streams both to the comb plates and to the step band. Branch conduits are necessary in the latter case. This measure requires a considerable installation effort. The originally heated air is simultaneously subject to continuous heat loss, depending on the length of the ducts.

JP-A 02 231391 describes a device for heating handrails. If humidity is present, the same will be detected by sensors. A drying device for the handrail, which is fixedly directed to the inner face of the handrail, and which is activated after detection of humidity, is arranged in the return strand of the handrail.

SUMMARY OF THE INVENTION

It is an object of the invention to provide a device for heating components in particular mobile components, of an escalator or a moving walkway, which does not require long flow distances to be travelled by the heated air, which has a low cost of acquisition, installation and maintenance, and which however has a higher efficiency. A retrofitting of existing installations shall also be possible.

This aim is achieved in that the respective heating element is fixed in a pivotal manner within the balustrade and/or within the step or pallet band at housing parts of the escalator or moving walkway and is directed onto the respective handrail and/or the step or pallet band.

Preferably register heating is used, which is composed of a radial or axial fan with a downstream heating cartridge of pre-determinable power (for example 1000 W). The small size of the unit(s) also enables an installation within the balustrade. Furthermore it is also possible to provide the device according to the invention within the step band or the maintenance area of the escalator or moving walkway. The simplified installation and the small size of the unit(s) thus enable a flexible and precise installation for heating the handrail, the step/pallet band, the comb plate or the like.

Due to this device, which is directly provided on site, the heat losses associated with the state of the art are reduced to a minimum.

A flexible holding of the respective heating element allows a precise orientation and heating of mobile components of the escalator or moving walkway, which are endangered by frost and humidity.

In comparison to the state of the art, the use of the device(s) according to the invention considerably increases the functional safety of the escalator or the moving walkway.

Temperature sensors monitor a maximum cartridge temperature in the respective heating cartridge, in order to avoid any dangerous condition in case of breakdown of the fan. A flow control unit, which is installed in front of the fan exit, additionally monitors the function of the fan and switches the system off in case of non-functioning of the fan. Contacts, which are additionally installed within the heating cartridge, allow the transmission of a trouble message.

BRIEF DESCRIPTION OF THE DRAWINGS

The subject of invention is represented in the drawing by means of an exemplary embodiment and described as follows. In the drawing.

DETAILED DESCRIPTION OF THE INVENTION

Figures 1A, 1B:
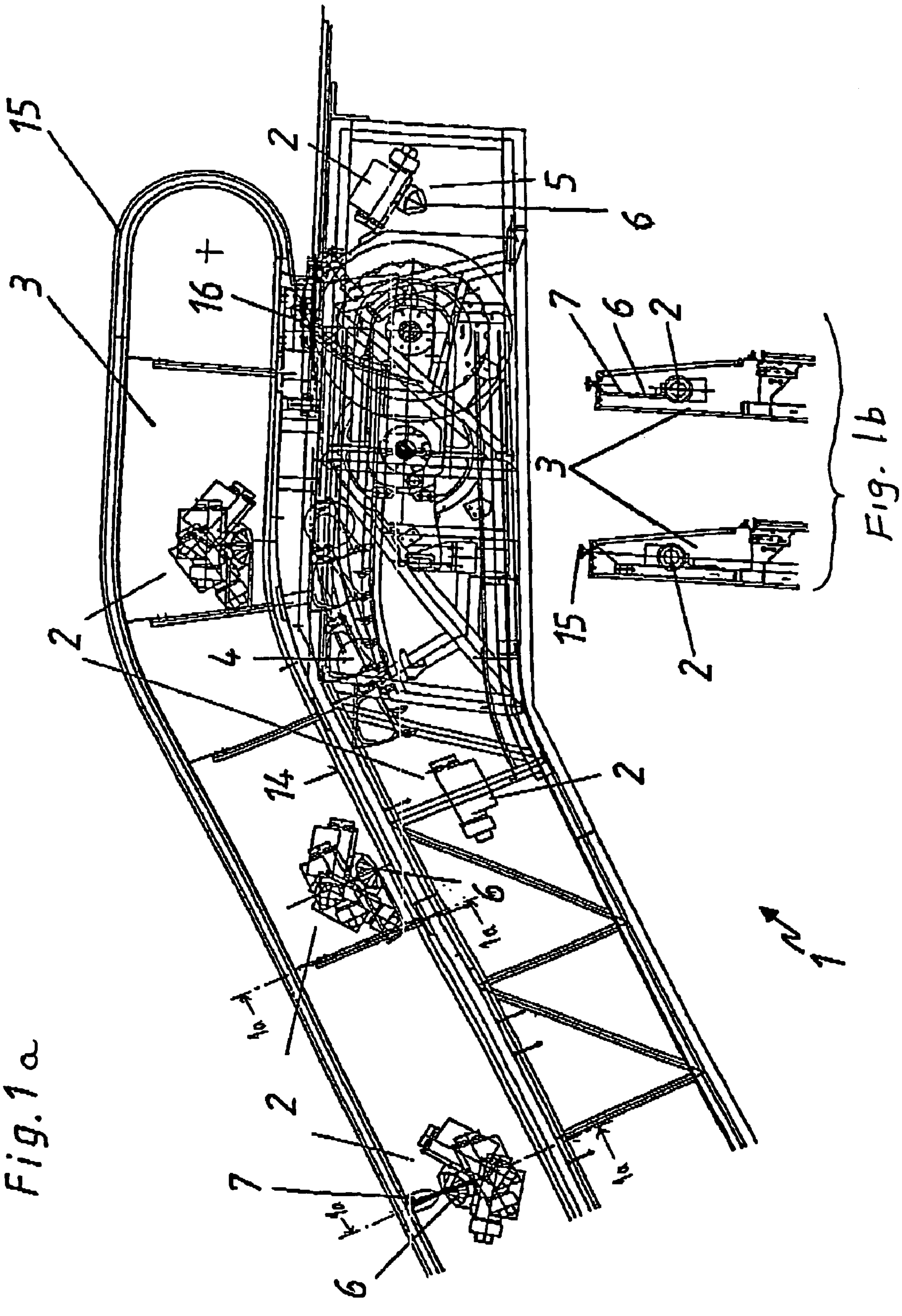
FIG. 1*a* is a schematic diagram of the arrangement of a heating device in different areas of an escalator.
FIG. 1*b* is a partial vertical section of FIG. 1.

FIG. 1*a* shows several devices 2 (heating elements), which are positioned at different points of an escalator for heating special components. Some of the devices 2 are provided in the area of the balustrade 3, another device 2 is respectively provided between the circulating step band 4 or within the maintenance area 5 of the escalator 1. The respective device 2 is fixed at corresponding components 7 of the escalator 1 via flexible holdings 6, such that a pivoting movement of the respective device 2 is possible. Thus, a precise orientation of the respective device 2 can be obtained, such that the generated hot air can be directly guided to the area to be heated without high energy losses. FIG. 1*b* is a sectional view through the balustrades in FIG. 1*a* showing the positioning of a heating element in each balustrade.

The devices 2, which are positioned within the balustrade 3, are directed towards the return strand 14 of the handrail 15. The device 2, which is placed between the step band 4, is directed towards the lower part of the upper step band 4, whereas the device 2, which is arranged in the maintenance area 5, is directed towards the entry area 16 of the step band 4.

Figures 2A, 2B:
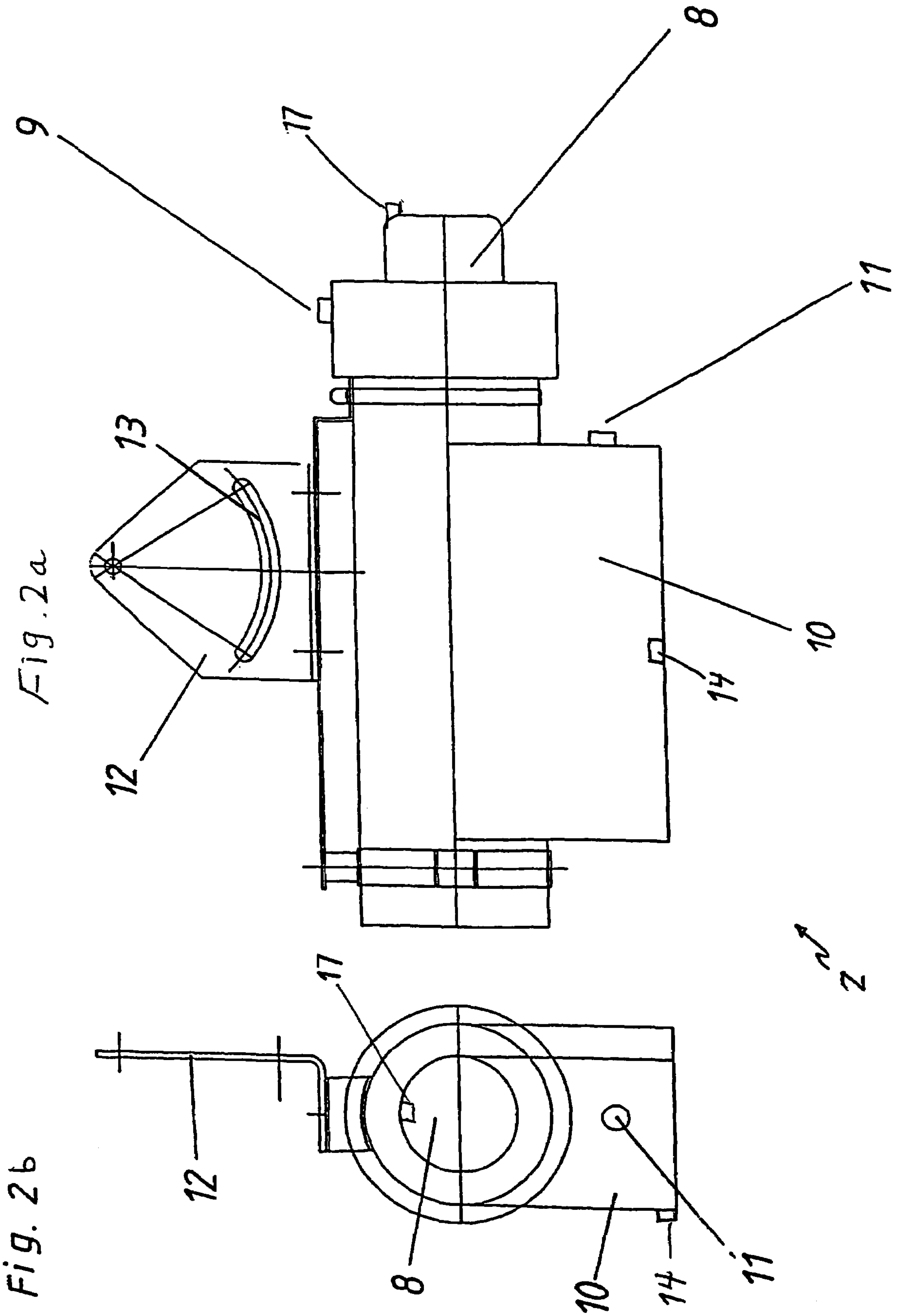
FIG. 2*a* is a side view which shows the principal structure of the heating device according to FIG. 1.
FIG. 2*b* is a right end view of FIG. 2*a*.

FIGS. 2*a* and 2*b* shows the principal structure of the device 2. A fan 8, which is configured as radial fan, including a power supply 9, a heating cartridge 10 including a power supply 11 as well as a flexible holding 12 are visible. The pivoting area of the device 2 is defined by an elongated hole 13. At least one temperature sensor 14 monitors a maximum cartridge temperature in the respective heating cartridge, in order to avoid any dangerous condition in case of breakdown of the fan. At least one flow control sensor 17, which is installed in front of the respective fan exit, additionally monitors the function of the fan and switches the system off in case of non-functioning of the fan.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A combination comprising:

an escalator or a moving walkway; and a device for heating components of the escalator or moving walkway, the device including at least one pivotably mounted heating element adapted to direct heated air onto a selected component of the escalator or moving walkway, wherein the at least one pivotably mounted heating element further comprises a register heater including an axial or radial fan having a downstream heating cartridge with pre-determinable power; and a flexible holding device adapted to position the at least one pivotably mounted heating element with respect to an area to be heated.

2. The combination according to claim 1, wherein the at least one pivotably mounted heating element is disposed within a balustrade of the escalator or moving walkway such that air emerging from the at least one pivotably mounted heating element can be directed onto a handrail of the escalator or moving walkway.

3. The combination according to claim 1, wherein the at least one pivotably mounted heating element is disposed within a housing adapted to receive a step or pallet band of the escalator or moving walkway such that air emerging from the at least one pivotably mounted heating element can be directed onto the step or pallet band.

4. The device according to claim I, wherein the at least one pivotably mounted heating element is placed in an area of a balustrade head of the escalator or moving walkway.

5. The device according to claim 1, wherein the at least one pivotably mounted heating element is adapted to direct heated air onto a return strand of a handrail of the escalator or moving walkway in a direction of movement of the handrail.

6. The device according to claim 1, wherein the heated air emerging from the at least one pivotably mounted heating element is directed onto a step or pallet entry of the escalator or the moving walkway.

7. The device according to claim 1, wherein the at least one pivotably mounted heating element further comprises at least one temperature sensor, the at least one temperature sensor adapted to switch off the at least one pivotably mounted heating element in the event of a malfunction.

8. The device according to claim 1, wherein the at least one pivotably mounted heating element further comprises a flow sensor, the flow sensor adapted to switch off the at least one pivotably mounted heating element in the event of a malfunction.

9. A combination comprising:

an escalator or a moving walkway; and a device for heating components of the escalator or moving walkway, the device including at least one heating element adapted to direct heated air onto a selected component of the escalator or moving walkway, wherein the at least one heating element further comprises a register heater including an axial or radial fan having a downstream heating cartridge with pre-determinable power; and a flexible holding device adapted to position the at least one heating element with respect to the selected component to be heated;

the at least one heating element being mounted within a balustrade or a housing adapted to receive a step or pallet band of the escalator or moving walkway.

10. The combination according to claim 9, wherein the at least one heating element is pivotably mounted within the balustrade of the escalator or moving walkway such that the heated air from the at least one heating element can be directed onto a handrail.

11. The combination according to claim 9, wherein the at least one heating element is a plurality of heating elements, at least one of which is disposed within the housing adapted to receive the step or pallet band of the escalator or moving walkway to direct heated air onto the step or pallet band.

12. The device according to claim 9, wherein the at least one heating element is placed in an area of a balustrade head of the escalator or moving walkway.

13. The device according to claim 9, wherein the at least one heating element is adapted to direct the heated air onto a return strand of a handrail of the escalator or moving walkway in a direction of movement of the handrail.

14. The device according to claim 9, wherein the at least one heating element further comprises at least one temperature sensor, the at least one temperature sensor adapted to switch off the at least one heating element in the event of a malfunction.

15. The device according to claim 9, wherein the at least one heating element further comprises a flow sensor, the flow sensor adapted to switch off the at least one heating element in the event of a malfunction.

* * * * *